(12) United States Patent
Gelernter et al.

(10) Patent No.: US 11,539,662 B2
(45) Date of Patent: Dec. 27, 2022

(54) SYSTEM AND METHOD FOR GENERATION OF SIMPLIFIED DOMAIN NAME SERVER RESOLUTION TREES

(71) Applicant: Cyberpion, Ltd., Givat Shumuel (IL)

(72) Inventors: Nethanel Gelernter, Givat Shumuel (IL); Jonathan Lebowitsch, Brooklyn, NY (US)

(73) Assignee: CYBERPION, LTD., Givat Shumuel (IL)

( * ) Notice: Subject to any disclaimer, the term of this patent is extended or adjusted under 35 U.S.C. 154(b) by 57 days.

(21) Appl. No.: 17/314,185

(22) Filed: May 7, 2021

(65) Prior Publication Data

US 2021/0352043 A1 Nov. 11, 2021

Related U.S. Application Data (60) Provisional application No. 63/021,300, filed on May 7, 2020.

(51) Int. Cl.

| | |
|---|---|
| *H04L 61/4552* | (2022.01) |
| *H04L 61/4511* | (2022.01) |
| *G06F 16/9038* | (2019.01) |
| *G06F 16/901* | (2019.01) |
| *H04L 45/02* | (2022.01) |
| *H04L 67/1031* | (2022.01) |
| *H04L 61/503* | (2022.01) |

(52) U.S. Cl.
CPC ...... *H04L 61/4552* (2022.05); *G06F 16/9027* (2019.01); *G06F 16/9038* (2019.01); *H04L 45/02* (2013.01); *H04L 61/4511* (2022.05); *H04L 61/503* (2022.05); *H04L 67/1031* (2013.01)

(58) Field of Classification Search
CPC .......................... H04L 61/4552; H04L 61/4511
See application file for complete search history.

(56) References Cited

U.S. PATENT DOCUMENTS

| | | |
|---|---|---|
| 8,886,929 B2 | 11/2014 | Smith et al. |
| 8,898,800 B1 | 11/2014 | Fredinburg et al. |

(Continued)

OTHER PUBLICATIONS

A Tool for DNS Delegation Trust Graphing, https://github.com/mandatoryprogrammer/TrustTrees (as of Mar. 2, 2020).

(Continued)

*Primary Examiner* — Minh Chau Nguyen
(74) *Attorney, Agent, or Firm* — M&B IP Analysts, LLC (57) ABSTRACT

A system and method for generating and representing a consolidated resolution tree of a network are provided. The method includes receiving a target fully qualified domain name (FQDN); creating at least one tentative equivalence class (TEC) containing all the internet root domain name servers (DNS); processing the at least one TEC to determine respective consolidated edges and vertices; retrieving nameservers from domain registration records; determining whether additional TECs are to be generated for the retrieved nameserver(s); processing all new TECs to determine respective consolidated edges and vertices, when it is determined that new TECs are to be generated; and generating a resolution tree for display based on the consolidated edges and vertices.

21 Claims, 9 Drawing Sheets

(56) References Cited

U.S. PATENT DOCUMENTS

| | | | |
|---|---|---|---|
| 8,949,997 | B2 | 2/2015 | Schmidt et al. |
| 9,141,717 | B2* | 9/2015 | Schneider ............. G06F 16/951 |
| 9,208,335 | B2 | 12/2015 | Wu et al. |
| 9,380,024 | B2 | 6/2016 | Schmidt et al. |
| 10,097,536 | B2 | 10/2018 | Wu et al. |
| 10,409,989 | B2 | 9/2019 | Mohinder et al. |
| 10,484,365 | B2 | 11/2019 | Wu et al. |
| 2009/0083422 | A1* | 3/2009 | McKay ............... H04L 63/0272 |
| | | | 709/225 |
| 2010/0205541 | A1* | 8/2010 | Rapaport ............... G06Q 30/02 |
| | | | 715/753 |
| 2011/0219067 | A1 | 9/2011 | Bernosky et al. |
| 2016/0306975 | A1 | 10/2016 | Schmidt et al. |
| 2017/0346640 | A1 | 11/2017 | Smith et al. |
| 2018/0241767 | A1 | 8/2018 | Crabtree et al. |
| 2019/0319868 | A1* | 10/2019 | Svennebring ......... H04L 41/147 |
| 2020/0004966 | A1 | 1/2020 | Mohinder et al. |
| 2020/0178198 | A1* | 6/2020 | Ding .................... H04W 60/04 |

OTHER PUBLICATIONS

Wikipedia contributors. "Reverse DNS lookup." Wikipedia, The Free Encyclopedia. Wikipedia, The Free Encyclopedia, Apr. 2, 2021. https://en.wikipedia.org/wiki/Reverse_DNS_lookup.

* cited by examiner

SYSTEM AND METHOD FOR GENERATION OF SIMPLIFIED DOMAIN NAME SERVER RESOLUTION TREES

CROSS-REFERENCE TO RELATED APPLICATIONS

This application claims the benefit of U.S. Provisional Application No. 63/021,300 filed on May 7, 2020, the contents of which are hereby incorporated by reference.

TECHNICAL FIELD

The present disclosure generally relates to detection of vulnerabilities within a network, and, more particularly, to systems and methods for improved and effective generation and representation of a tree of nodes.

BACKGROUND

The use of the Internet over the past three decades has escalated in previously unimaginable numbers. Such expansion allows inter- and intra-communications for enterprises, businesses, governments, non-government organizations, or others, to providing for successful maintenance of connection with practically anyone. Such rapid growth, which has provided numerous benefits, includes two distinct problems. First, the network may have vulnerabilities and various malicious actors, who exploiting such vulnerabilities.

As organizations' networks develop, network nodes are added to networks to increase capacity and resolve the complex communication schemes used by such networks. Among others, these nodes include a plurality of servers, such as domain servers, name servers, authorization servers, data servers, and the like. Such servers allow for the resolution of communications over the Internet, which may be handed over from one node to another. For example, if a first node wishes to access another node, the first node attempts to resolve the received address by connecting to another node, or nodes, for such address resolution. In turn, such nodes may further direct the request to other nodes, and the process may thus continue.

Such activity is compounded as, in certain cases, the servers used are not physical servers but, rather, are various types of virtual machines that are created or otherwise formed in the cloud. As a result, as a network grows or shrinks, the risk of having one or more residual servers is always present. These residual nodes remain connected to the network and represent a vulnerability. This vulnerability arises when accessing such nodes, which may be connected to other nodes, enables unauthorized access to the network. Such vulnerabilities in the network are often used by those who wish to penetrate the network in harmful or otherwise-unauthorized ways. Every change, misconfiguration, or security vulnerability in each of the servers that participate in the resolution process might pose risk to the resolved domain. Furthermore, every inconsistency or mistake in the resolution process (e.g., referring the traffic to a server to which it should not be referred) exposes, or might expose, the resolved domain to security attacks or to performance problems.

The rise of public cloud and content delivery network (CDN) providers, which host an ever-increasing number of applications, has brought a new complexity and an increasing likelihood of misconfigurations and potential vulnerabilities to organizations' Domain Name System (DNS) infrastructures. The advent of virtualization and cloud infrastructure also makes correct DNS setups ever-more important. The association between addresses and the services and applications that are accessible through the addresses is becoming a more transient, automatically-changing, fungible relationship. The main, and, possibly, the only construct, for finding a site or application on the internet, is through an application's Fully Qualified Domain Name (FQDN). Thus, DNS systems need to continually update themselves as applications evolve and move from one set of IP addresses to another, sometimes through chains of associations. Failures in keeping the DNS systems correctly configured can result in both severe operational disruptions as well as in organizational exposure to severe security risks. There is then an urgent need for systems that continuously monitor DNS systems and provide alerts for misconfigurations and potential vulnerabilities, and such systems need to be able to present to users, at any given time, the state of the DNS resolution paths for each of the FQDNs.

The prior art suggests to provide a network tree by mapping all the nodes that may be accessed as a result of a request for a name resolution. As noted above, these trees may be complex and hold dozens, hundreds, or thousands of possible nodes. Such prior art systems provide these nodes either as long and incomprehensible lists, or as displays of all the nodes as a map of complex connections that are difficult to decipher. For example, GitHub® provides a platform on which users can provide tools for DNS delegation trust graphing. The referenced platform also provides an example of how such a process may work, thereby resulting in a display of either a list of internet protocol (IP) addresses, or of complex connections of many nodes which are difficult to comprehend, even with the simple example provided (see FIG. 5).

It would, therefore, be advantageous to provide a solution that overcomes the deficiencies of the prior art and provides a way to identify such nodes which put the network at risk.

It would further be advantageous if a notification of the existence of such nodes is provided. It would be additionally advantageous if such a solution would be efficient in realizing the large number of nodes connected to the network, as well as the network's continuous changes.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for generating and representing a consolidated resolution tree of a network. The method comprises: receiving a target fully qualified domain name (FQDN); creating at least one tentative equivalence class (TEC) containing all the internet root domain name servers (DNS); processing the at least one TEC to determine respective consolidated edges and vertices; retrieving nameservers from domain registration records; determining whether additional TECs are to be generated for the retrieved nameserver(s); processing all new TECs to determine respective consolidated edges and vertices, when it is determined that new TECs are to be generated; and generating a resolution tree for display based on the consolidated edges and vertices.

Certain embodiments disclosed herein also include a non-transitory computer readable medium having stored thereon instructions for causing a processing circuitry to execute a process, the process comprising: receiving a target fully qualified domain name (FQDN); creating at least one tentative equivalence class (TEC) containing all the internet root domain name servers (DNS); processing the at least one TEC to determine respective consolidated edges and vertices; retrieving nameservers from domain registration records; determining whether additional TECs are to be generated for the retrieved nameserver(s); processing all new TECs to determine respective consolidated edges and vertices, when it is determined that new TECs are to be generated; and generating a resolution tree for display based on the consolidated edges and vertices.

In addition, certain embodiments disclosed herein include a system for generating and representing a consolidated resolution tree of a network. The system comprises: a processing circuitry; a network interface for interfacing to a network, the network interface communicatively connected to the processing unit; and a memory, the memory containing instructions that, when executed by the processing circuitry, configure the system to: receive a target fully qualified domain name (FQDN); create at least one tentative equivalence class (TEC) containing all the internet root domain name servers (DNS); process the at least one TEC to determine respective consolidated edges and vertices; retrieve nameservers from domain registration records; determine whether additional TECs are to be generated for the retrieved nameserver(s); process all new TECs to determine respective consolidated edges and vertices, when it is determined that new TECs are to be generated; and generate a resolution tree for display based on the consolidated edges and vertices.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

In complex network systems employed by an enterprise, multiple nodes are used for different tasks, such as domain servers, name servers, mail servers, data servers, and the like. In certain cases, and certainly over time, certain nodes, which were in use, or intended to be in use, are no longer such nodes, and therefore are network vulnerabilities. This presents a potential security risk, such as by exposing the network to hostile attacks.

According to the disclosed embodiments, a system and method for generate a representation of the tree of nodes for such a network are provided. The disclosed embodiments also provide for effectively displaying the tree of nodes by grouping certain nodes of the tree that operate similarly. Tree generation begins from a predetermined node and continues with all nodes communicatively connected thereto and where status of connectivity determined. In an example embodiment, a tree of grouped nodes is displayed in an interactive manner.

Figure 1:
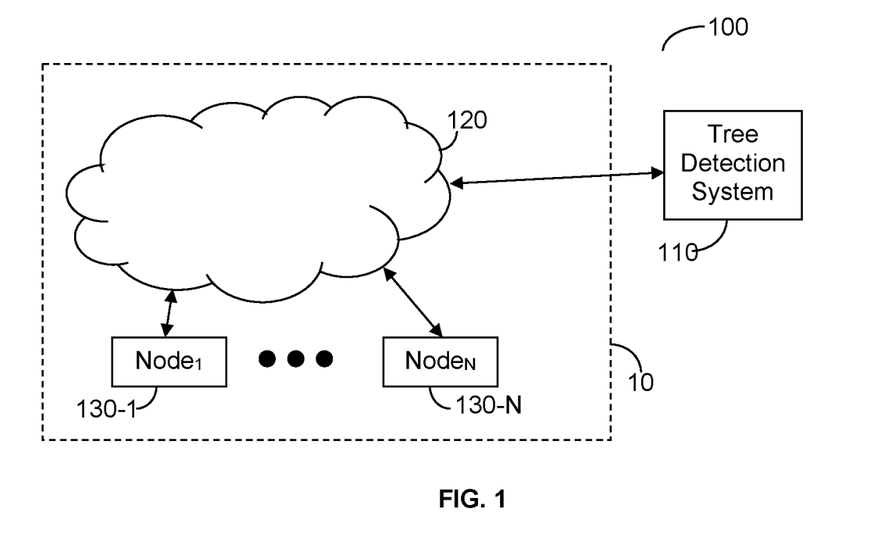
FIG. 1 is a schematic diagram of a network of nodes that are to be checked by a tree detection system for effective display of a tree of nodes, according to an embodiment.

FIG. 1 is an example schematic diagram 100 of a network of nodes 10 to be checked by a tree detection system 110 for effective display of a tree of nodes, according to an embodiment. The network of nodes 10 may include a network 120, where the network 120 may be a local area network (LAN), a wide area network (WAN), a metro area network (MAN), the Internet, a wireless, cellular, or wired network, and the like, and any combination thereof. The network 120 may further be wired or wireless, as well as any combination thereof.

The network 120 may be communicatively connected to one or more nodes 130, such as, for example, nodes 130-1 through 130-N, where N is an integer equal to or greater than '1.' The nodes 130 may comprise a variety of different nodes including, but not limited to, web servers, name servers, mail servers, data servers, and the like. Moreover, such nodes may also be virtual machines (VMs) that are operable on hardware upon which they execute and which are used for physical communication with the network 120.

Each server may have one or more particular tasks which the server performs for the network or in connection with a particular structure of nodes within the network. Such network structures are also discussed herein, for example, with respect to FIG. 4. For example, a name server resolves the domain names used within a network. The process of name resolution may involve access to a plurality of nodes 130 communicatively connected to the network 120.

It should be readily appreciated that various components of the network 120 are not shown herein, such as, for example, routers. However, these components may be further involved in address resolution processes and, in such cases, may operate as a node 130 in accordance with the present disclosure. It should be further appreciated that a DNS system, and any analogous name resolution system, is but a small subsystem of a network it serves, where the present disclosure relates to aspects of management of name resolution systems.

A tree detection system (TDS) 110, for detection of vulnerable nodes, may be further connected to the network of nodes 10, for example, by communicatively connecting the TDS 110 to the network 120. The TDS 110 is configured, as described in greater detail herein, to detect the tree structure by sending requests to each name server node upon receiving instructions to access that node for the purpose of name resolution, i.e., to discover the tree structure for any FQDN. For example, a network structure may comprise one or more domain servers, email servers, name servers, data servers, or the like.

Due to error, omission, or other problems in working the complex network structure, one or more nodes of the structures may not be serving the network structure but may still remain therein. This is a lingering threat to the integrity of a network structure as attempts may be made to use such stale nodes for the purpose of infiltrating the network structure, i.e., all the nodes and interconnects of a network. This may cause a security breach and lead to significant damages, including, in the case where no harm was done but the vulnerability of the network structure is known, causing clients to lose trust in the network structure. Such a network structure may be of a bank, a credit card company, an online store, an online clearing house, a government agency, or the like. The TDS 110 is therefore adapted, as described herein, for the detection of the network tree structure and to provide an effective display of the node tree. This display provides for practical addressing of network vulnerabilities, wherever such vulnerabilities may exist.

Figure 2:
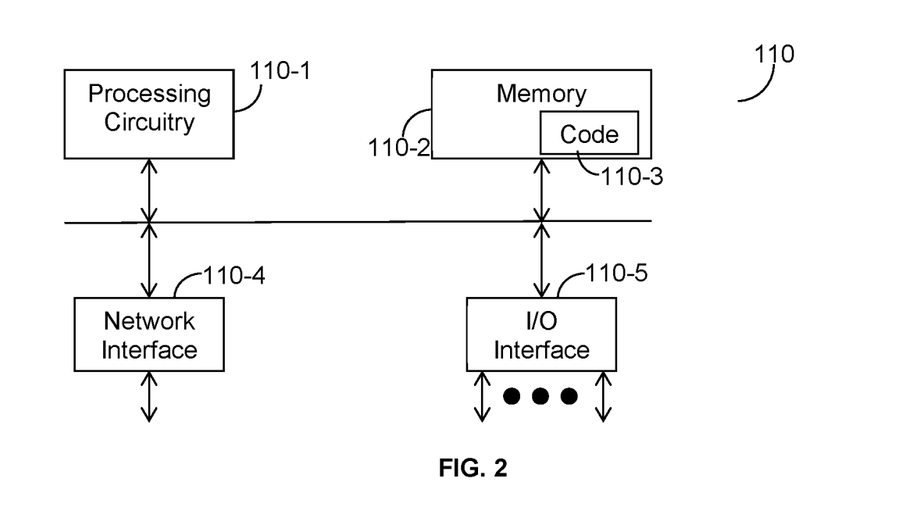
FIG. 2 is a schematic diagram of the tree detection system for effective display of a tree of nodes, according to an embodiment.

FIG. 2 is an example schematic diagram of the tree detection system 110 for effective display of a tree nodes, according to an embodiment. The TDS 110 includes a processing circuitry 110-1 which may be, for example and without limitation, a central processing unit (CPU), or other like devices which may execute instructions stored in memory which cause the TDS 110 to perform the functions described in greater detail herein.

A memory 110-2 is communicatively connected to the processing circuitry 110-1. The memory 110-2 may include both volatile memory, such as random-access memory (RAM), dynamic RAM, and the like, as well as non-volatile memory, i.e., memory that is not erased or otherwise lost when no electrical power is supplied. A portion of the memory 110-2 may be used as a scratch pad memory for storing and retrieving data used by the processing circuitry 110-1 as the processing circuitry 110-1 performs the tasks resulting from the execution of instructions. Such instructions may be stored in a code section 110-3 of the memory 110-2.

The processing circuitry 110-1 is configured to access the memory 110-2 to read instructions stored in the code section 110-3 and executes them, thereby performing the tasks the TDS 110 is adapted to perform according to an embodiment, and in particular, the task of efficiently displaying nodes of the network structure. The TDS 110 further includes a network interface 110-4 which enables communicative connection to a network, such as, for example, the network 120.

The processing circuitry 110 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In addition, the TDS 110 further includes an input/output (I/O) interface 110-5, which allows the TDS 110, through the I/O interface 110-5, to be attached to, for example and without limitation, a display (not shown), a keyboard (not shown), a pointing device (not shown), and the like. A display device (not shown) connected to the system 110 using the I/O interface 110-5 may provide for the display of a network trust tree as further described herein. This should not be viewed as limiting the scope of the disclosed embodiments, as it is recognized that other ways of displaying such content are possible and are an integral part of the present disclosure. The network trust tree therefore illustrates all the paths through which DNS records can be resolved.

Figure 3:
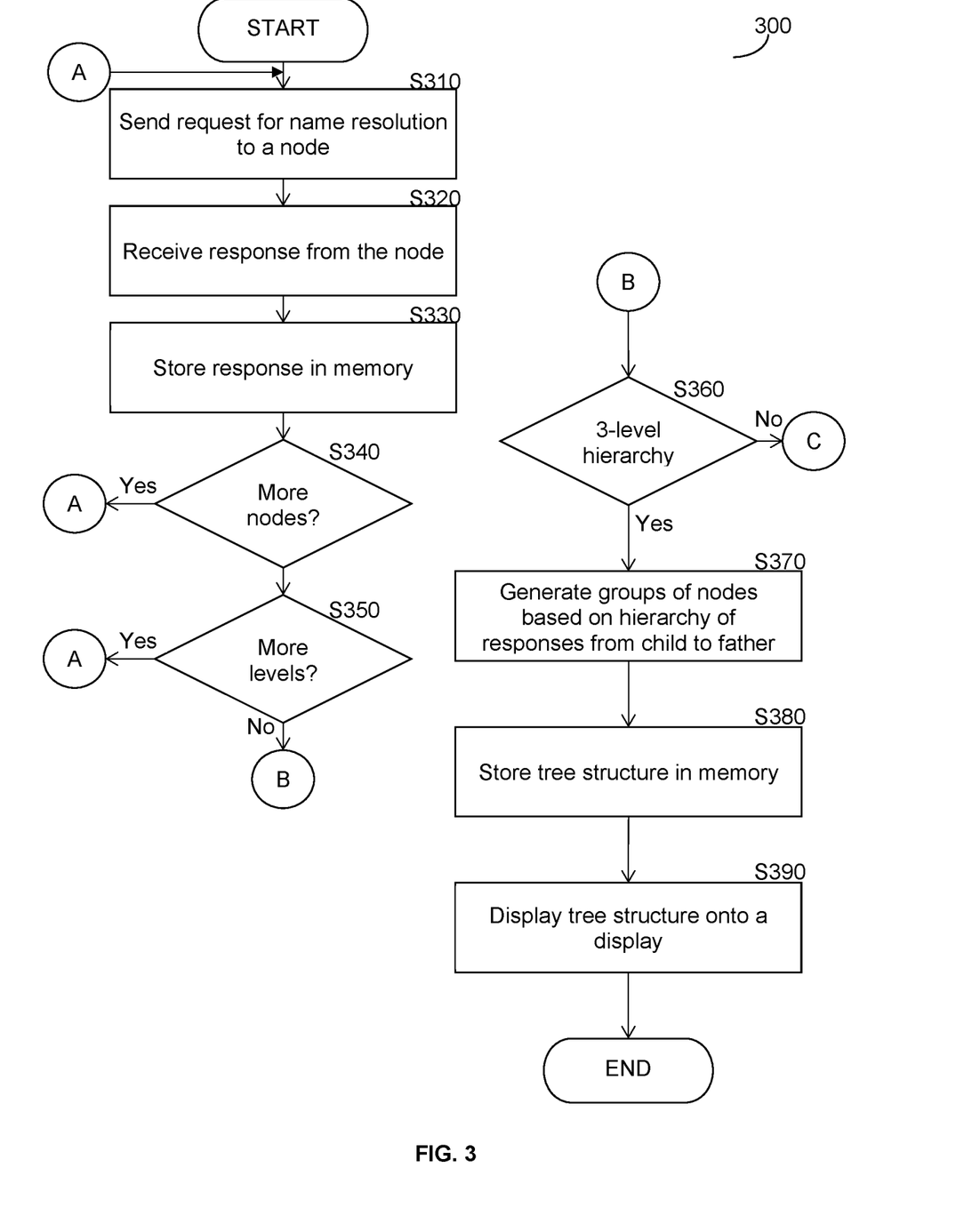
FIG. 3 is a flowchart of a method for effective display of a tree of nodes, according to an embodiment.

FIG. 3 is an example flowchart 300 of a method for effective display of a tree of nodes, according to an embodiment. In an example embodiment, the method 300 is performed by the TDS 110 for the purpose of detection of the network tree, and then, for each of three levels of hierarchy, grandfather node, father node, and child node, grouping nodes according to the principles described herein.

The process of grouping may be repeated for each of the three such levels at any depth of the network tree. By effectively grouping nodes which have responded similarly to a father node, a more compact and effective display of the trust tree is made possible and, further, the suspect nodes which may be vulnerable are more easily determined and/or viewable.

The process may begin at the root node where a single address is provided and where the name resolution request is sent to such root nodes, which may, in certain embodiments, comprise a plurality of different nodes. For instance, in the case of any publicly resolvable FQDN, all the DNS root servers are checked for the root of the tree. Accordingly, the TDS 110 will access every node at such a level.

Then, based on the responses, or lack thereof, which may also be considered a response of the kind 'no response,' additional name resolutions may be made based on the address provided for the next level name resolution. This process iterates as explained with respect to FIG. 3, as described in greater detail herein.

Returning to FIG. 3, at S310, a request for a name resolution to is sent to a node in the network.

At S320 a response is received from the node receiving the request at S310. It should be noted that, in some cases, such a node will not respond at all and a timeout will be reached. In such a case, the response will be considered to be a 'no response for timeout.' Other responses may be the requested address, a request to perform the name resolution with another node, or an error message, such as, for example, refusal to perform the name resolution. Certain responses may be determined to indicate a level of threat to the network. For example, not responding before timeout, or refusing to respond, may be determined as a threat to the integrity of the network of nodes.

At S330 the response is stored in memory, such as, for example the memory 110-2 of TDS 110.

At S340 it is checked whether additional nodes need to be similarly checked, and, if so, execution returns with S310; otherwise, execution continues with S350. It should be noted that requesting name resolution for multiple nodes is not a conventional method. Typically, once an answer is provided, the requestor continues with the name resolution. However, according to the disclosed embodiments all the possible options can be checked for the purpose of the creation of the network tree and, thereafter, determination of the trust tree of the network tree.

At S350, it is checked whether it is necessary to check the next level, and, if so, execution continues with S310; otherwise, execution continues with S360. A responding node may be a node that has children of its own and, therefore, it may be necessary to continue to check additional levels. When it is determined that such additional levels exist, it is necessary to continue to check such additional levels.

At S360, it is checked whether grouping can take place and, if so, execution continues with S370, as further described herein; otherwise, execution continues with S380. As noted, grouping takes place if there are three or more levels of hierarchy present. This means that there is a grandfather node whose answers referred to and, thus, caused the system to initiate a check with one or more father nodes, and one or more father nodes whose answers referred to and, thus, caused the system to initiate a check with one or more child nodes. Based on responses received from the child nodes by the father nodes, grouping for the father nodes is possible.

At S370 a grouping of nodes at the father level takes place. Such grouping is based on the responses received to each of the father nodes from the child nodes, and groups together those nodes which have the same response. For example, in the case of three father nodes A, B and C, each of these nodes is required to communicate with three other nodes X, Y, and Z. When A communicates with any of X, Y, and Z, A receives, from each, a first response. When B communicates with any of X, Y, and Z, B receives, from each, a second response. Likewise, when C communicates with any of X, Y, and Z, C receives from each a third response. Assuming that the first and the second responses are the same kind of response, and the third response is different, the father nodes A, B, and C are grouped into two groups, the first group containing nodes A, and B and the second group containing node C.

It should be readily appreciated that, by doing so, the number of objects being displayed is significantly reduced, as a single group is displayed, rather than a display of each node and its specific connections. Furthermore, considering the complexity of the responses and number of nodes involved, such a task may be impossible to do manually, especially as the process may change dynamically as the network evolves over time. In particular, such grouping is useful as virtual machines (VMs) can go on and off of the network with ease, which may have not been previously seen. The number of virtual machines in a typical enterprise may be thousands.

It should be emphasized that the process of grouping grandfather nodes, father nodes, and child nodes is repeated over and over again until all nodes which can be grouped are properly grouped.

At S380 the network tree, either as grouped at S370, or ungrouped if grouping was not possible, is stored in memory, such as, for example, memory 110-2 of TDS 110.

At S390, the network tree is displayed, such as, for example, on a display device (not shown). According to an embodiment, the displayed tree is interactive such that grouped nodes can be, for example, clicked on using a pointing device (not shown) communicatively connected to the I/O interface 110-5 of TDS 110. In response to the network tree being displayed, the display provides more detailed information regarding the group, including, and without limitation, Internet protocol (IP) addresses, domain names, subtrees, and the like.

The display may further include information, either text, visual, or otherwise, which provides indications for the risk potential from the group displayed. For example, if the group is a group which includes one or more nodes which have refused to provide a response, then an alert indication may be provided. In an embodiment the interactivity of the nodes and the edge nodes provide for the nodes', and edge nodes', reaction to events. For example, and without limitation, on mouse-over, more details are presented, or, when clicking or double-clicking on a domain name inside a node, which might contain multiple domain names, the tree of the clicked domain may be presented.

Figure 4:
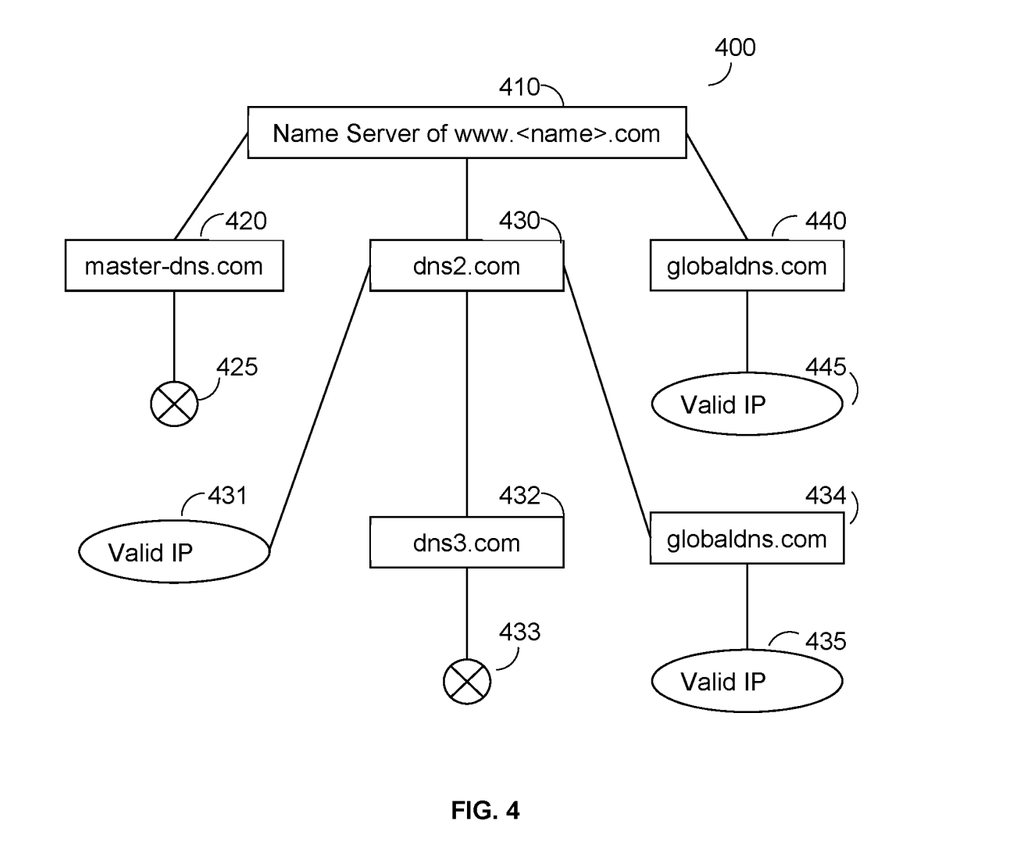
FIG. 4 is a first trust tree diagram of a network after detection, according to an embodiment.

FIG. 4 is an example first trust tree diagram 400 of a network after detection, according to an embodiment. In the example, a root node 410 is provided, such as, for example, name server of www.<name>.com. The root node 410 communicates with several DNS name servers, such as, for example, master-dns.com 420, dns2.com 430, and globaldns.com 440. Each of these servers 420, 430, and 440 are communicatively connected to the root node 410, which is a name server. In turn each of these nodes checks further down the hierarchy. For example, master-dns.com 420 returns a node 425 which does not provide a valid response and which, therefore, is marked with an "X." Such demarcation may represent a vulnerability which needs to be addressed. It should be appreciated that according to the disclosure, a tree for some FQDN is generated, but that FQDN is not necessarily the root of an entire tree. The whole tree corresponds with one FQDN (e.g., www.<name>.com).

Similarly, global-dns.com 440 reaches a node 445 which responds in a way which is valid and, thus, the node 445 is considered a non-vulnerable node and is marked accordingly. The node dns2.com 430 returns node 431 and receives a valid response, which is so marked. The node dns2.com 430 then accesses dns3.com 432 which also responds in a valid manner. However, when node dns3.com 432, in turn, addresses a node 433, a suspect response is provided and, therefore, node 433 is marked as vulnerable. Furthermore, node 430 communicates with globaldns.com 434, which is the same server that was directly referred to by the node 410 and defined as node 440. Such communication may be possible as network structures evolve and become increasingly complex and demonstrates the need for an automated solution to check the practically endless possibilities for a network structure which may also include inner loops.

In such a case, globaldns.com 434 returns a node 435, a valid response, and marks node 435 accordingly. In one embodiment, each node, such as, for example, node 430, may be a collapsed into a single unit for display purposes but may, for example, in response to a click, expand a subtree. Furthermore, the edge nodes 425, 431, 433, 435, and 445 represent the DNS responses. Return of an empty response with different statuses (e.g., Refused, NXDOMAIN, NOERROR, etc.) may be possible.

In an embodiment, a timeout may be illustrated similarly as a different type of node. In an embodiment, the edge nodes may be represented by, for example, different geometrical shapes, such as, for example, squares for authoritative nameservers, and ellipses for answers which may contain therein one or more domains, or a geometrical shape unique for each group having similar characteristics. Furthermore, each node may be interactive, such as, for example, where clicking on the image of an authoritative nameserver may show the nameserver's domain; and CNAME records may be similarly follow.

Moreover, additional codes, such as for example, and without limitation, color codes or icon codes, textual information, and the like, may be further added to the geometrical representations, providing additional information such as a vulnerability indication, a non-existing domain, a typo, and the like. Furthermore, other combinations may be used for case where the DNS response is the same, while the DNS status is different. Nevertheless, for compact display purposes, these may be viewed in the same graphical representation. More generally, the trees show all, or some, of the domains and/or paths involved, directly or indirectly, in the resolution of DNS record. The interactivity considers also other DNS trees, such as those beyond the domains that appear in the DNS tree of a domain, where the DNS tree includes a dependency on the DNS trees of each of them, which is a recursive process.

It should be further understood that interactivity may be also added, according to an embodiment, to the arcs (which may also be referred to as graph arcs) connecting the nodes of the graph. For example, the arc connecting node 410 to node 420 may be designated as interactive so that, when clicked, additional information is provided regarding the message sent from the root node 410, which is a name server, to the name server 420, and the message returned therefrom.

Moreover, the description of FIG. 4 should not be viewed as limiting upon the scope of the disclosed embodiments as there are many types of records, and, for each record, it is possible to build trust tree. It should be further noted that the responses sent from a node to an inquiring node may vary and may include status codes, such as no error, refused, time out, server failure, and the like. Such responses may further, or alternatively, include content as a record, and, in one embodiment, multiple responses are possible.

In one embodiment, a response from an authoritative name server may be provided, in response to a query message, the response specifying which nodes are other authoritative name servers within the trust tree. Moreover, in some responses, there exists a possibility to add data which may be used to provide additional information about the node being checked.

In one embodiment, the TDS 110 is configured to employ a computerized method or process which is executed from instructions stored in memory 110-2. The method or process, when executed, adapts the TDS 110 to generate a communication trust tree.

In an embodiment, the method including receiving an address of a starting node in a communication tree; collecting, for each node of the communication tree, extending from the starting node, a response from at least another node of the communication tree; grouping nodes based on their responses having a same response into a group, such that each node communication tree is associated with a group; generating a communication trust tree that comprises a hierarchical tree of groups; and determining whether each group of the communication trust tree is a threat to the communication trust tree based on the response common to each group.

It should be appreciated that the starting node may be a root node. It should be further appreciated that the response is one of: an Internet Protocol (IP) address, an error message, or a refusal to respond message. Moreover, the root node may be a dummy node or a node that describes the role and/or the meaning of its children. Furthermore, a refusal to respond message is automatically assumed for a node which has not responded within a predefined period of time. Moreover, the communication trust tree may determine a threat of a particular level depending on the kind of response received by the inquiring node.

In one embodiment, an alert is generated for the group upon determination of the threat of the group, and such a group may further comprise multiple levels. In yet another embodiment, the alert is generated by the TDS 110 upon determination that the threat level is above a predetermined level. In yet another embodiment, the TDS 110 is further adapted to display each group of the node on a display based on the node's position in the hierarchy; to display communication links from groups sending requests for the responses; and to display a warning notification on each group determined to include the threat.

Figure 5:
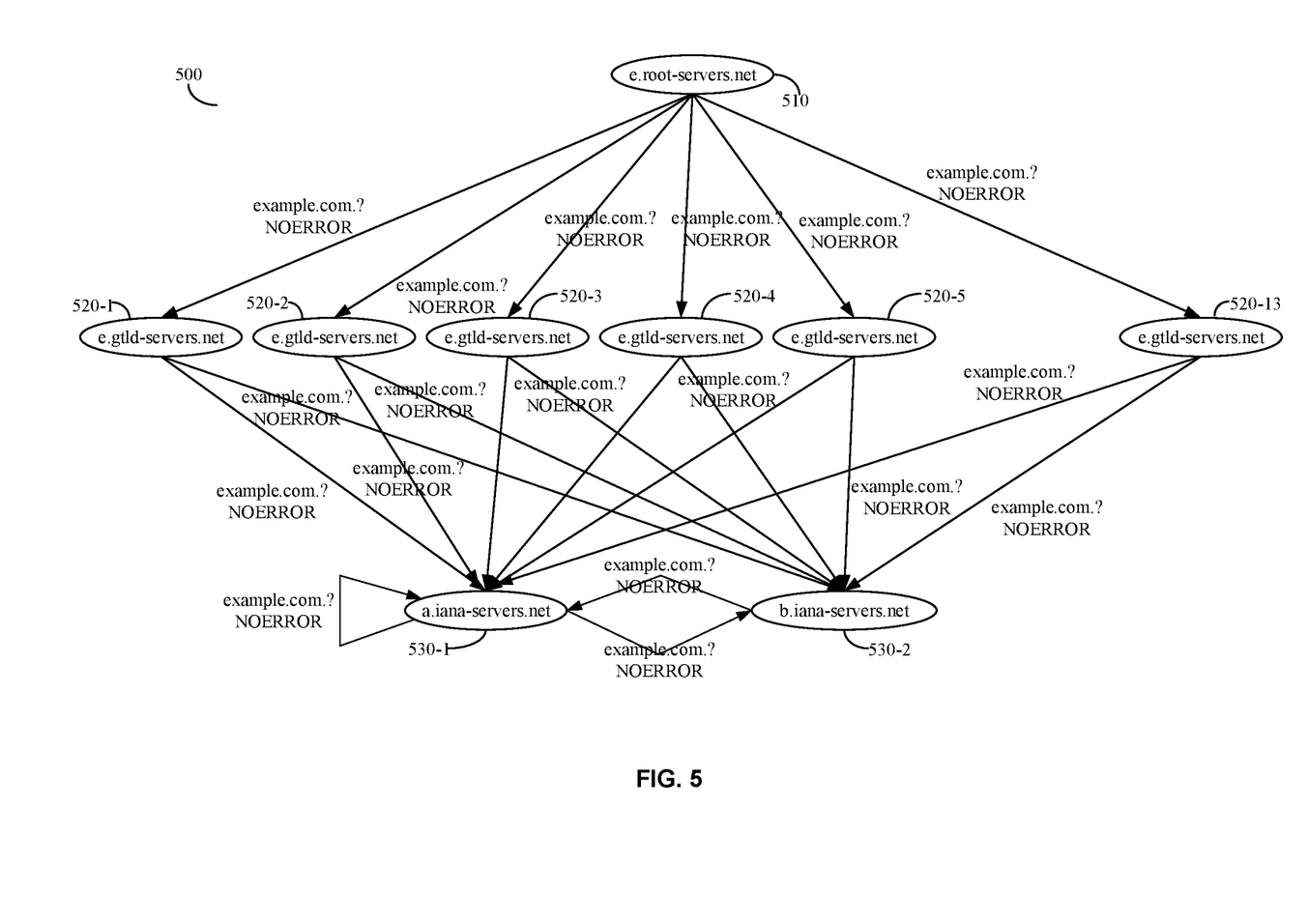
FIG. 5 is a trust tree diagram representation generated using prior art techniques.

FIG. 5 is an example trust tree diagram 500 representation generated using conventional techniques. The example shown is a simplified representation wherein a root server e.root-server.net 510 is used as the initial node for the generation of a trust tree diagram for example.com. In the example case, the resolution of the address is attempted through thirteen nameservers, a.gtld-servers.net 520-1 through a.gtld-servers.net 520-13. Each of the nameservers 520 may resolve the name address by referring to two other nameservers, a.iana-servers.net 530-1 or b.iana-servers.net 530-2. Moreover, the nameservers 530-1 and 530-2 may communicate with each other for name resolution as shown in the diagram. The result is a complex representation diagram. It may be appreciated that, in practical cases often encountered in the network area, such prior art solutions do not provide the necessary result.

Figure 6A:
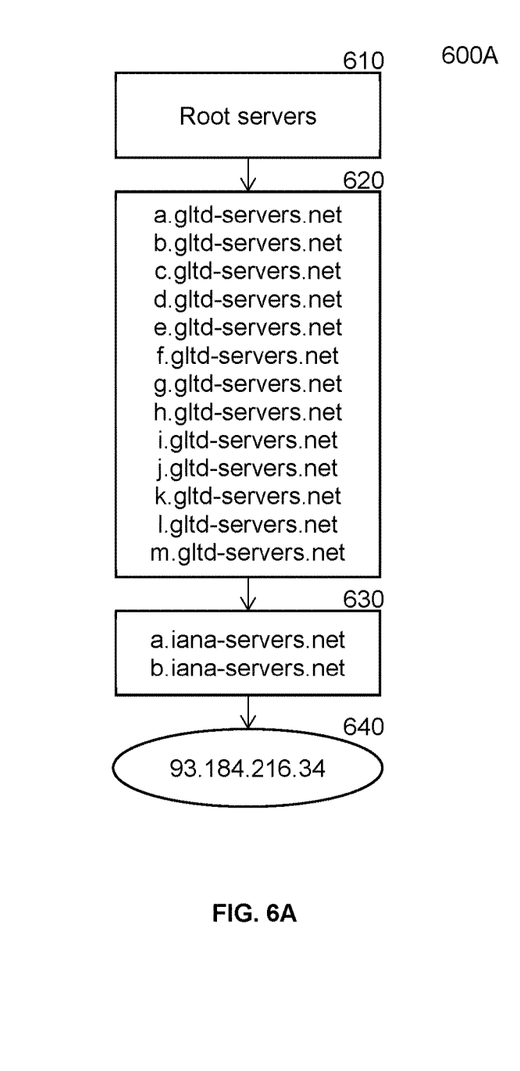
FIG. 6A is a trust tree diagram representation generated according to an embodiment.

FIG. 6A is an example trust tree diagram 600A representation, generated according to an embodiment. According to the disclosure, as it is determined that the nameservers 520-1 through 530-13, depicted by reference 620, function in the same manner and provide the same results upon enquiry from the e.root-servers.net 510, they are all combined into a single nameserver representation 620. The two nameservers 530-1 and 530-2 are combined into a single representation 630 as they also provide a function that is the same and, therefore, can be represented by a single unit representation. The response from the DNS 640 is also shown.

Figure 6B:
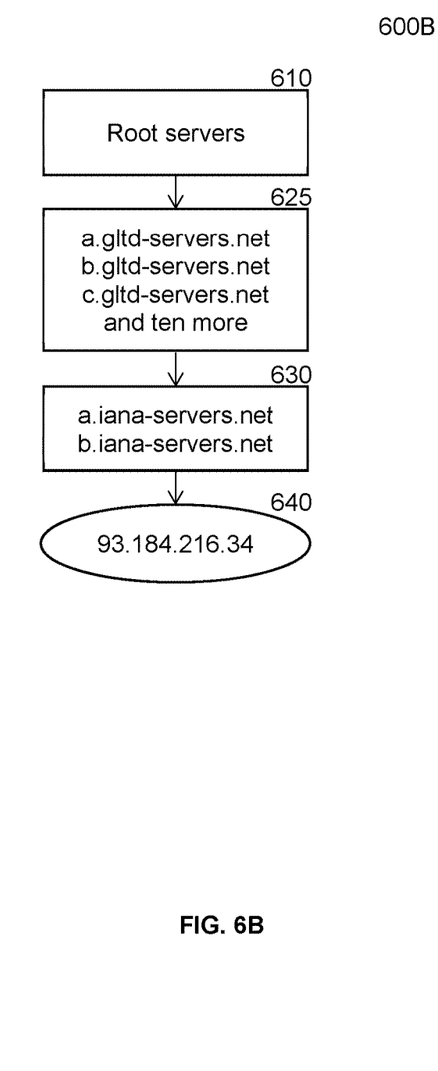
FIG. 6B is a collapsed trust tree diagram representation generated according to an embodiment.

FIG. 6B is an example collapsed trust tree diagram 600B representation, generated according to an embodiment. In the case described with respect to FIG. 6B, representation of all thirteen nameservers 520 is unnecessary and, rather, three nameservers 520 are named and the others are described as existing, as is depicted by reference 625. It may be understood that the diagrams 600A and 600B are a superior representation, over prior art solutions, of the same network shown in FIG. 5.

It should be further appreciated that achieving such a collapse of data is a complex effort, especially for complex networks having dozens, hundreds, or even thousands of nodes for which to account. The given example is for a case of no errors detected, but such a case is not a typical case for existing networks, and such networks will typically also present errors and vulnerabilities which must be addressed. Such errors and vulnerabilities can only be determined if the system handling the complex connections between the nodes is presented in a way that allows for such detection.

It should be further appreciated that the trust trees described herein are merely examples of trust trees which may be generated according to the disclosure. Specifically, such trees may represent the resolution of any DNS record. The record that contains an IP address is for example purposes and should not be viewed as limiting upon the scope of the disclosure. Furthermore, it may be understood that DNS trees can start from a specific node within a network tree, not necessarily from the ROOT DNS servers, such as, for example, DNS trees that start from the nameservers that are specified in the NS records of a domain.

As explained herein, the central purpose for the display of a DNS resolution tree is to communicate, visually, the DNS resolution paths, and the existence of misconfigurations, vulnerabilities, or other problems, with the DNS system, with respect to the way the DNS system resolves a particular FQDN. There are many paths for resolving any FQDN, and the current state of the art in presenting DNS resolution paths involves the representation of each and every name server involved in the resolution as a single vertex, which results in large, complicated, and hard-to-decipher graphs, with many vertices and edges. Such graphs tend to obfuscate more than they reveal. The system and methods described herein are advantageous over such prior art as they provide simpler and more-intelligible tree graphs, the vertices of which collect together nodes that, in the ways shown herein, behave equivalently. The result is graphs that have significantly fewer vertices and edges, and where, accordingly, errors and misconfigurations are much easier to highlight and pinpoint and, therefore, to analyze.

According to the teachings herein, two name servers are considered equivalent with respect to a target FQDN if: 1) any name server that returns one of the name servers in response to DNS queries about the target FQDN, or the FQDN's domains/subdomains, also returns the other name server for the same query; 2) both name servers have routable IP addresses, or both have non-routable IP addresses, or both are non-resolvable; and, 3) both name servers respond, themselves, with the same answer, to DNS queries for the target FQDN or the target FQDN's domains/subdomains. Hence, the equivalence class of a name server, with respect to a specific target FQDN, is the set of all name servers that are equivalent to the name server, as defined herein.

As shown herein, there are several main elements to the simplified DNS trees that the system, such as, for example, the system 110, generates. These elements are titles, vertices, and directed edges. The title is a single target FQDN. The tree represents the DNS resolution paths for this single target FQDN. The vertices may be, but are not limited to, two main types. A first type of vertices is a list of all name servers that belong to the same equivalence class, as described above. A second type of vertices are final vertices that contain final answers provided by the name servers. These can be of the following subtypes: (i) no answer, (ii) a specific error, (iii) group of one or more internet protocol (IP) addresses, or (iv) a canonical name record (CNAME).

Each directed edge connects some pair of vertices in the graph, which may be referred to by the terms "father" and "daughter," or "father" and "child," to represent such connected vertices. A father vertex has an edge to a daughter vertex of type group of servers if and only if each member of the father vertex returns all the members of the daughter vertex as names of name servers in DNS queries about the target FQDN or the target FQDN's domains/subdomain. A father vertex has an edge to a final vertex of type no answer, some error code, group of IP addresses, or a CNAME, if and only if all the members of the father vertex return that same no-answer, error code, group of IP addresses, or CNAME, as the case may be, in response to a request to resolve the target FQDN.

Accordingly, in an embodiment, the root vertex of each tree is the list of the internet's group of root DNS name servers. The root vertex's immediate daughter is the set of all the name servers for the top-level domain (TLD) of the target FQDN that the root servers delegate to. In most cases, the TLD name servers are all equivalent and will also be collected into a single vertex, but, in rare cases, when there is no consistency in the responses of this group of servers about the group of servers to delegate requests for the second-level domain (SLD), there will be no single vertex that groups all the TLD name servers.

It should therefore be appreciated that at that level, or any subsequent level, the vertices are going be either: 1) one or more groups of name servers that: a) are all returned by the same set of name servers in response to a DNS query about the target FQDN (or its domains/subdomains); and, b) That all provide the same answer to a DNS query about the target domain, where an answer can be a final answer, or a delegation to another set of name servers; or, 2) the final answer that may be one of: no answer, some error, a set of IP addresses, or a CNAME.

Figure 7:
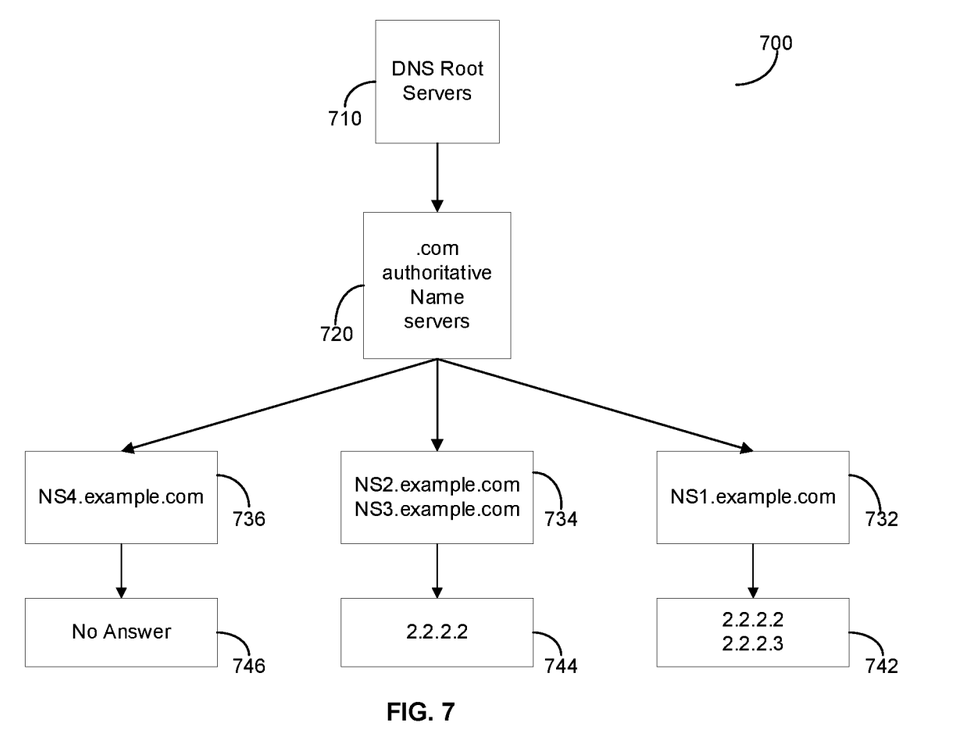
FIG. 7 is a resolution tree generated for a first target fully-qualified domain name, according to an embodiment.

FIG. 7 is an example resolution tree 700 generated for a first target FQDN, according to an embodiment. When resolving the target FQDN, www.example.com, the root servers 710 delegate, to the .com name servers 720 the list of names of name servers for these two groups, which is omitted from display for conciseness. All the .com name servers 720 delegate to the same list of name servers NS1 . . . NS4.example.com, for the domain example.com. Note that this is necessary as, otherwise these name servers would not have been grouped into the same vertex. However, according to the principles disclosed herein, the tree splits into three: NS1.example.com 732 returns two IP addresses 742, namely: 2.2.2.2 and 2.2.2.3. This is different from NS2 and NS3 734, which return 744, which is only 2.2.2.2. Hence, the latter two fall into their own equivalence group and vertex, while a $3^{rd}$ vertex is just for NS4 736, which does not answer 746.

Figure 8:
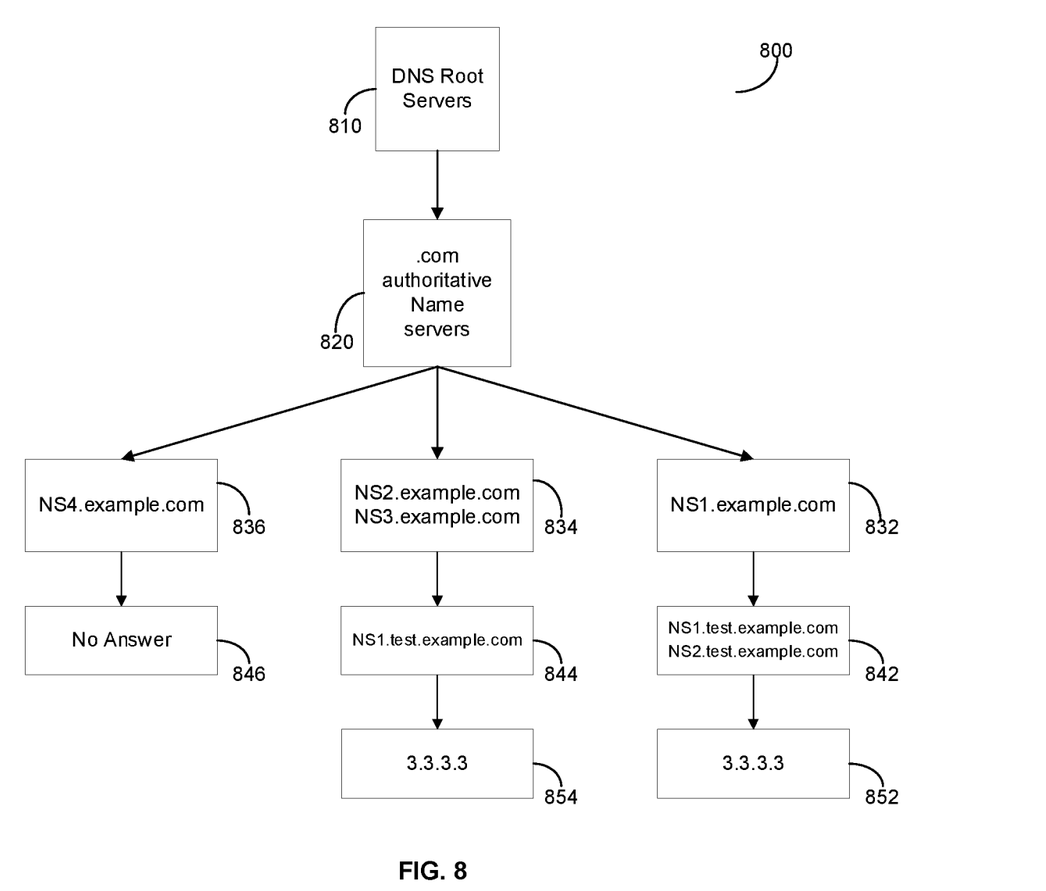
FIG. 8 is a resolution tree generated for a second target fully-qualified domain name, according to an embodiment.

FIG. 8 is an example resolution tree 800 generated for a second target FQDN, according to an embodiment. In this example, the tree for the target FQDN www.test.example.com is shown. The .com name servers 820 delegate resolution of FQDNs in the example.com domain to NS1 . . . NS4.example.com (83x). NS4.example.com 836 does not answer for the target FQDN (or its subdomain, "test.example.com"). NS2 and NS3.example.com 834 answer by delegating to the nameserver NS1.test.example.com 844, and are, thus equivalent, while NS1.example.com 832 responds by providing the names of two name servers, NS1 and NS2.test.example.com 844. All the test.example.com name servers 842 and 844 return the same IP address, 3.3.3.3 852 and 854.

In one or more exemplary embodiments, additional information may be added to and/or presented in the display of the resolution trees. Such augmentations may include additional text or other visual indications within the graph, in order to: 1) highlight final vertices, and/or the final vertices' direct parents and/or the edges between the two, when these are, or respond with, errors, or do not answer, or return a non-routable IP address; 2) add the name servers' own IP addresses to the text within the vertices; 3) highlight sets of vertices of groups of servers that fail to satisfy some DNS best practice, such as, for example and without limitation, availability across different subnet classes; 4) highlight nameservers which are unreachable because of a lack of a DNS record, or a non-routable IP address; 5) differentiate, for example, but not by way of limitation, by using different colors or shapes, between authoritative and non-authoritative name servers; or 6) differentiate, for example, but not by way of limitation, by using different colors or shapes, between authoritative name servers as discovered by the DNS system start of authority (SOA) records, and those records specified in the domain registration records for a domain.

Figure 9:
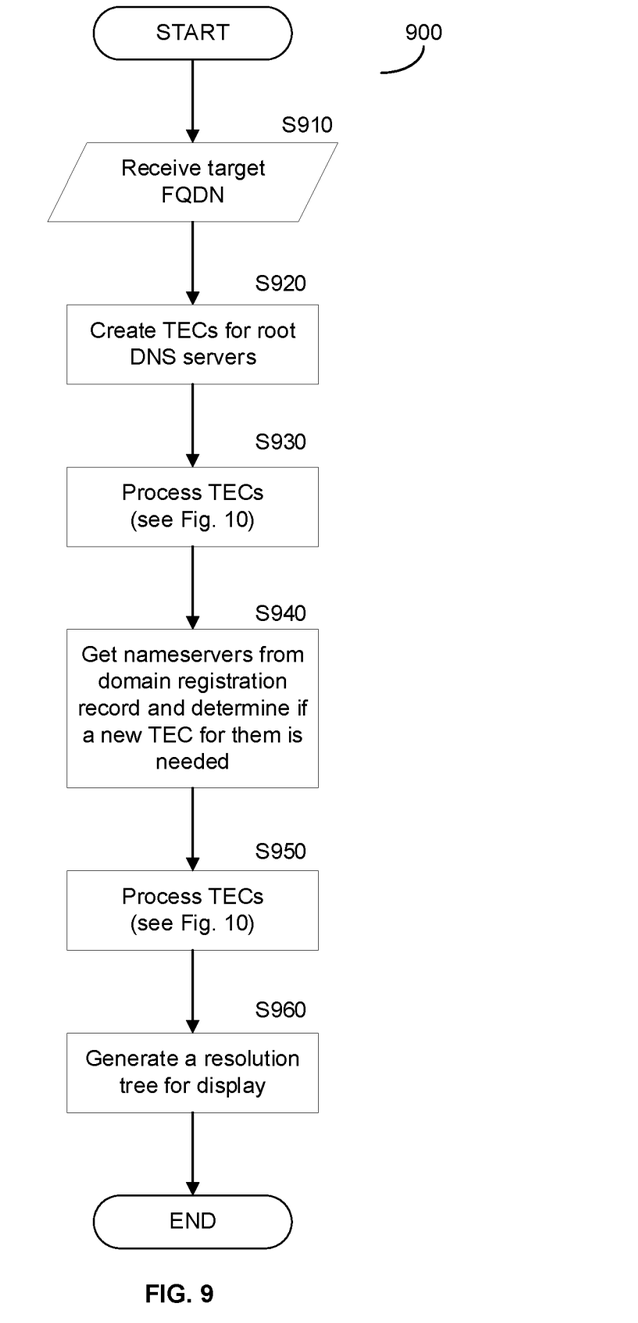
FIG. 9 is a flowchart describing a method for creation of a resolution tree, according to an embodiment.

FIG. 9 is an example flowchart 900 depicting a method for creation of a resolution tree according, to an embodiment. At S910, a target FQDN is received. At S920 a tentative equivalence class (TEC), containing all the internet root DNS servers, is created. At, S930 each of the TECs is processed as further described in FIG. 10.

Figure 10:
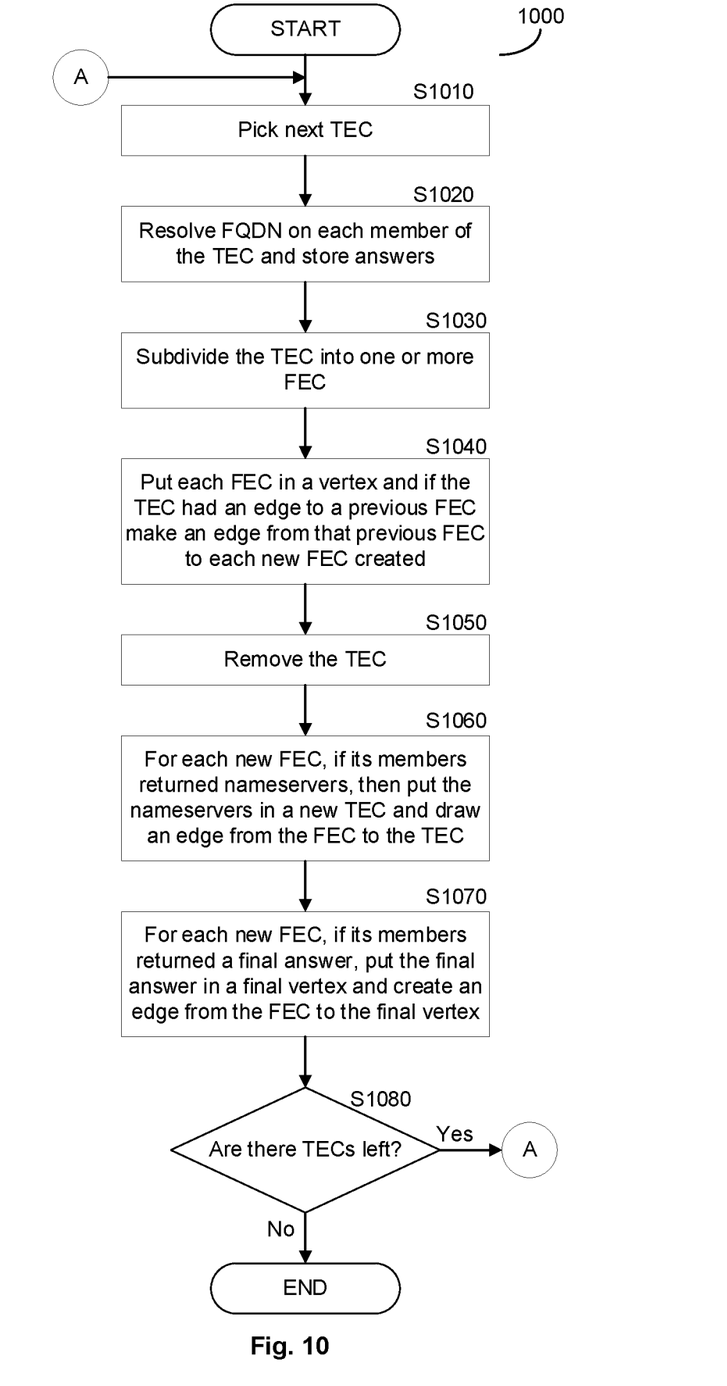
FIG. 10 is a flowchart describing a method for processing a tentative equivalence class, according to an embodiment of the creation of the resolution tree.

FIG. 10 is an example flowchart 1000 depicting a method for processing a TEC, according to an embodiment of the creation of the resolution tree. At S1010, a TEC is picked to be processed from the TECs previously created and which has not yet been picked for processing. At S1020, FQDN resolution takes place for each member of the TEC, and answers are stored, for example, in memory 110-2. At S1030, the selected TEC is subdivided into one or more final equivalence classes (FECs). At S1040, each FEC from S1030 is associated with a vertex and, if the TEC being processed had an edge to an FEC, then an edge is drawn from the previous FEC to each new FEC created. At S1050, the TEC that was processed is removed so that it is not reprocessed. In another embodiment, the processed FEC may be simply marked as having been handled. At S1060, for each new FEC, if the FEC's members returned nameservers, then the nameservers are associated with a new TEC and an edge is drawn from the FEC to that TEC. At S1070, for each new FEC, if the FEC's members returned a final answer, the final answer is associated with a final vertex and an edge is created from the FEC to the final vertex. At S1080, it is checked whether there are TECs left to be processed and, if so, execution continues with S1010; otherwise, execution of the TEC processing terminates.

Returning to FIG. 9, at S940, the list of name servers is retrieved from a domain registration record and, if there are any name servers which are not members of any existing vertex, a new TEC is created to hold all such name servers. At S950, processing of the new TEC created at S940 takes place, which uses the same process described with respect to S930, and which is, therefore, not repeated here. At S960, a resolution tree is generated and prepared for display in accordance with the principles disclosed herein.

Hence, in an embodiment, a process for generation of a resolution tree, according to the principles disclosed herein, may include: 1) receiving the target FQDN; 2) creating one or more TECs containing all the internet root DNS servers; 3) iteratively, until there are no TECs, performing, for each TEC: a) for each member of the TEC, querying it with the target FQDN and recording the answer; b) subdividing the TEC into one or more FECs based on TEC members' responses, where two members of a TEC belong to the same FEC if the members return the same answer, creating a vertex for each new FEC and, if the TEC had an edge from a previous FEC, adding an edge from that FEC to all the new FECs now created; c) removing the TEC; and d) for each FEC created in step 3)b): (1) if name servers were returned in 3)a) by any and, thus, all of its members, creating a TEC with the names of all the name servers returned and creating an edge from the FEC to the TEC; and, (2) If any A records or CNAME record were returned by any and, thus, all of its members, creating a final vertex with these answers and creating an edge from the FEC to that final vertex; and, 4) getting the name servers from the domain registration record for the Apex domain. For name servers which are not members of any vertex in the tree generated so far, create a new TEC with just those members and then repeat step 3. At the end, the resolution tree is ready and may be generated for display to a user of the system.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating and representing a consolidated resolution tree of a network, the method comprising:
   receiving a target fully qualified domain name (FQDN);
   creating at least one tentative equivalence class (TEC) containing all the internet root domain name servers (DNS);
   processing the at least one TEC to determine respective consolidated edges and vertices;
   retrieving nameservers from domain registration records;
   determining whether additional TECs are to be generated for the retrieved nameserver(s); processing all new TECs to determine respective consolidated edges and vertices, when it is determined that new TECs are to be generated; and
   generating a resolution tree for display based on the consolidated edges and vertices.

2. The method of claim 1, further comprising:
   selecting a TEC not previously processed;
   resolving FQDN for each member of the TEC not previously processed;
   subdividing the TEC into at least one final equivalence class (FEC);
   creating a vertex for each FEC; and
   creating an edge from the previous FEC to each new FEC created if the TEC had an edge to a previous FEC.

3. The method of claim 2, wherein for each new FEC, if its members of the new FEC returned a final answer, further comprising:
   adding a final vertex containing the final answer; and,
   creating an edge from the FEC to the final vertex.

4. The method of claim 3, wherein the final answer is any one of: an Internet Protocol (IP) address, an error message, and no answer.

5. The method of claim 2, further comprising:
   removing the processed TEC after completion of processing.

6. The method of claim 2, further comprising:
   marking the processed TEC as a processed TEC.

7. The method of claim 2, wherein for each new FEC, when members of the new FEC return nameservers, further comprising:
   adding the nameservers in a new TEC; and
   drawing an edge from the FEC to the TEC.

8. A non-transitory computer readable medium having stored thereon instructions for causing a processing circuitry to execute a process for generation of a consolidated network resolution tree, the process comprising:
   receiving a target fully qualified domain name (FQDN);
   creating at least one tentative equivalence class (TEC) containing all the internet root domain name servers (DNS);
   processing the at least one TEC to determine respective consolidated edges and vertices;
   retrieving nameservers from domain registration records;
   determining whether additional TECs are to be generated for the retrieved nameserver(s); processing all new TECs to determine respective consolidated edges and vertices, when it is determined that new TECs are to be generated; and
   generating a resolution tree for display based on the consolidated edges and vertices.

9. The non-transitory computer readable medium of claim 8, the process further comprising:
   selecting a TEC not previously processed;
   resolving FQDN for each member of the TEC not previously processed;
   subdividing the TEC into at least one final equivalence class (FEC);
   creating a vertex for each FEC; and
   creating an edge from the previous FEC to each new FEC created if the TEC had an edge to a previous FEC.

10. The non-transitory computer readable medium of claim 9, wherein for each new FEC, if its members of the new FEC returned a final answer, the process further comprising:
    adding a final vertex containing the final answer; and,
    creating an edge from the FEC to the final vertex.

11. The non-transitory computer readable medium of claim 10, wherein the final answer is any one of: an Internet Protocol (IP) address, an error message, and no answer.

12. The non-transitory computer readable medium of claim 9, the process further comprising:
    removing the processed TEC after completion of processing.

13. The non-transitory computer readable medium of claim 9, the process further comprising:
    marking the processed TEC as a processed TEC.

14. The non-transitory computer readable medium of claim 9, wherein for each new FEC, when members of the new FEC return nameservers, the process further comprising:
    adding the nameservers in a new TEC; and,
    drawing an edge from the FEC to the TEC.

15. A system for generating and representing a consolidated resolution tree of a network, comprising:
    a processing circuitry;
    a network interface for interfacing to a network, the network interface communicatively connected to the processing unit;
    a memory, the memory communicatively connected to the processing circuitry and containing their instructions that, when executed by the processing circuitry, configure the system to:
    receive a target fully qualified domain name (FQDN);
    create at least one tentative equivalence class (TEC) containing all the internet root domain name servers (DNS);
    process the at least one TEC to determine respective consolidated edges and vertices;
    retrieve nameservers from domain registration records;
    determine whether additional TECs are to be generated for the retrieved nameserver(s);
    process all new TECs to determine respective consolidated edges and vertices, when it is determined that new TECs are to be generated; and
    generate a resolution tree for display based on the consolidated edges and vertices.

16. The system of claim 15, wherein the system is further configured to:
    select a TEC not previously processed;
    resolve FQDN for each member of the TEC not previously processed;
    subdivide the TEC into at least one final equivalence class (FEC);
    create a vertex for each FEC; and
    create an edge from the previous FEC to each new FEC created if the TEC had an edge to a previous FEC.

17. The system of claim 16, wherein for each new FEC, if its members of the new FEC returned a final answer, the system is further configured to:
    add a final vertex containing the final answer; and, create an edge from the FEC to the final vertex.

18. The system of claim 17, wherein the final answer is any one of: an Internet Protocol (IP) address, an error message, and no answer.

19. The system of claim 16, wherein the system is further configured to:
   remove the processed TEC after completion of processing.

20. The system of claim 16, wherein the system is further configured to:
   mark the processed TEC as a processed TEC.

21. The system of claim 16, wherein for each new FEC, when members of the new FEC return nameservers, the system is further configured to:
   add the nameservers in a new TEC; and
   draw an edge from the FEC to the TEC.

* * * * *